MIXING CIRCUIT
Filed Jan. 30, 1946
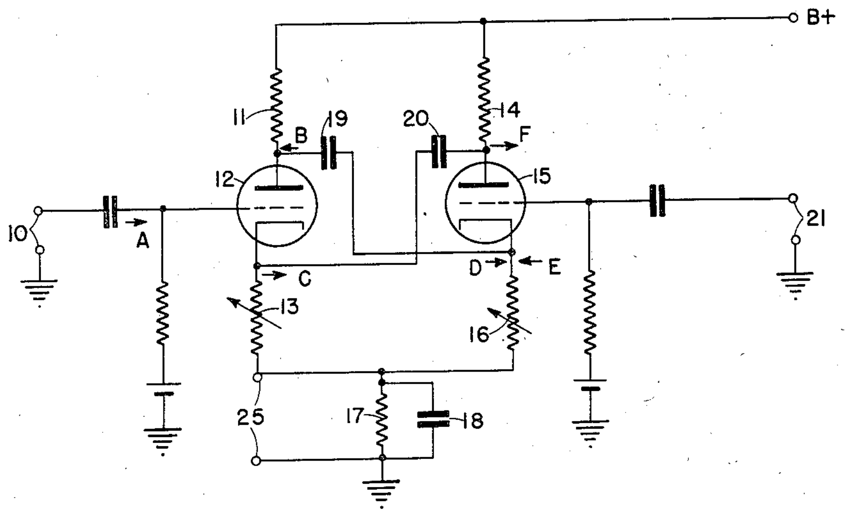
Inventor
RICHARD F. POST
By
Attorney Patented July 8, 1952

2,602,889

UNITED STATES PATENT OFFICE 2,602,889

MIXING CIRCUIT

Richard F. Post, Alexandria, Va.

Application January 30, 1946, Serial No. 644,391

6 Claims. (Cl. 250—27)

(Granted under the act of March 3, 1883, as amended April 30, 1928; 370 O. G. 757)

This invention relates to a novel signal mixing circuit which is adapted to produce a beat frequency difference signal output from a pair of input signals of distinct frequencies.

Previously, in mixing circuits producing several signal components, a sharply tuned rejection filter system has ordinarily been necessary in order to isolate a single desired beat frequency component from the remaining signal components present in the circuit output. Consequently, in cases where the beat frequency components are varied over an extended frequency range the rejection filtering system becomes increasingly more complex. Additionally, the use of a rejection filtering circuit ordinarily requires that the elements comprising the rejection filter be retuned for each new beat frequency component.

It is an object of this invention to provide a signal mixing circuit which is rendered free of the foregoing disadvantages.

It is a further object of this invention to provide a signal mixing circuit which will effectively isolate the input circuit for a first input signal from the input circuit for a second input signal.

Other objects and advantages of the invention will be apparent from the following detailed description when taken in conjunction with the accompanying drawings in which the single figure is a detailed circuit diagram of a preferred embodiment of the invention.

In accordance with the present invention, a mixing circuit is provided which comprises a pair of vacuum tubes, each of which is adapted to receive a separate input signal of distinct frequency or a band of frequencies. The tube components are so cross-connected and arranged relative to a common impedance element, across which the circuit output terminals are taken, that the original, or input, signal frequencies are balanced out across the output terminals thereby leaving only the beat frequency components available at this point. As hereinafter described in detail the beat frequency difference signal is the only signal component which is of interest. Consequently, the beat frequency sum signal is eliminated from the circuit output terminals by means of a suitable by-pass capacitor.

The invention may be better understood by referring more specifically to the single figure in the accompanying drawing. In the drawing the tube components comprising the preferred embodiment of the invention are indicated at 12 and 15, with the plate of each tube cross-connected to the cathode of the other via capacitors 19 and 20. Each of the tubes is plate loaded by resistances 11 and 14, respectively, and cathode loaded by variable resistances 13 and 16, respectively. The common impedance element across which the output terminals 25 are taken is represented as a suitable resistance element 17, which connects the junction points of resistances 13 and 16 to ground.

In the circuit of the drawing, a first signal of one frequency or band of frequencies is impressed at terminals 10 to the grid of the vacuum tube 12 and a second signal of a second frequency or band of frequencies is impressed at terminals 21 to the grid of tube 15. The instantaneous polarity of the signal introduced at the grid of tube 12 is represented, for purposes of illustration, as arrowhead A. This signal is amplified at the plate and at the same time displaced 180 degrees in phase by normal amplification action at the plate, as shown by arrowhead B. However the signal represented by arrowhead C appearing at the cathode of this tube is in phase with the original signal A, since the cathode resistor 13 brings about a normal cathode follower action. A portion of the cathode signal C will also appear at the cathode of the tube 15, due to the coupling action of the common cathode resistance 17. This signal is represented as arrowhead D. The plate signal B of the tube 12 is also coupled to the cathode of the tube 15 by the coupling means 19, this signal being represented as arrowhead E. It will be seen that plate signal E is opposite in phase to cathode signal D and the two will tend to cancel. Thus, by making the plate resistors 11 and 14, or the cathode resistors 13 and 16, or even the coupling capacitors 19 and 20 variable the signal component applied at terminals 10 and appearing at the cathode of tubes 12 and 15 can be set so as to cancel out across the common cathode resistance 17. For purposes of illustration only the cathode resistances 13 and 16 are made variable. In cancelling out the signal component applied at terminals 10 and appearing across output terminals 25 the signal phase represented by arrowhead E must predominate at the cathode of tube 15.

At the same time, the signal appearing at the cathode of tube 12 which is opposite in phase to that represented by arrowhead E is coupled through capacitor 20 to the plate of tube 15 and appears thereat as represented by arrowhead F. Thus, non-linearity is introduced into the output of the tube 15, tending to facilitate the production of beat-frequency signals. Likewise the production of beat-frequency signals is facilitated by the non-linearity of the tube 12, produced by the the phase opposition of signals B and C. It can be readily understood that the action at the cathodes and plates of the two tubes resulting from the input signal at the grid of the second tube by way of terminals 21 is similar to the action described above. Thus the signal component applied at the terminals 21 may likewise be cancelled at the output terminals 25. Thus it will be recognized that the original or input signals are cancelled at the output terminal 25, while it has been found that the resulting beat frequency signal components add across the output terminal 25. If additional discrimination against the input signals is desired, this filtering can be attained by connecting a by-pass condenser 18 across the resistor 17. This condenser is especially useful in filtering out the summation beat frequency signal when only the difference beat frequency is desired. If this summation beat frequency is high enough, the signal may be additionally filtered by the interelectrode tube capacitance, which will have low reactances as compared to the plate resistors 11 and 14 and the cathode resistors 13 and 16.

In a specific example of this circuit, a type 6SN7 tube, having twin triodes in a single envelope, was used as the tubes 12 and 15. Cathode resistors 13 and 16 were variable resistances with a maximum value of 15,000 ohms; plate resistors 11 and 14 were both valued at 18,000 ohms; the output means 17 was a 22,000 ohm resistor; and the coupling means 19 and 20 were 0.01 mfd. and 150 mmfd. capacitors, respectively. One input signal had a frequency of 120 kilocycles and the other was variable between 130 and 180 kilocycles.

While only a certain preferred embodiment of this invention has been described, it is realized that many modifications and variations of this invention may be made and no limitations upon this invention are intended other than may be imposed by the scope of the appended claims.

The invention described herein may be manufactured and used by or for the Government of the United States of America for governmental purposes without the payment of any royalties thereon or therefor.

What is claimed is:

1. A frequency mixing circuit comprising a pair of vacuum tubes each having at least an anode, a cathode and a grid, means for introducing a first signal to be mixed to the grid of one of said tubes and a second signal to be mixed to the grid of the other tube, coupling means cross-connecting the anode of each tube to the cathode of the other tube, resistive means connecting the cathode of each of said tubes to a common terminal, resistive means connected from the plate of each of said tubes to a common plate voltage supply, and output means connected to the common terminal of said cathode resistors.

2. A frequency mixing circuit comprising a pair of vacuum tubes each having at least an anode, a grid and a cathode, impedance means cross-connecting the anode of each tube to the cathode of the other, a separate input terminal coupled to the grid of each of said tubes, and a single impedance coupling means connected in common with both of said tubes and across which a pair of output terminals are connected.

3. A frequency mixing circuit comprising a pair of vacuum tubes each having at least an anode, a grid and a cathode, impedance means cross-connecting the anode of each tube to the cathode of the other, a separate input terminal coupled to the grid of each of said tubes, and a single impedance coupling means connected in common with the cathode circuits of said tubes and across which the output from the circuit is taken.

4. A frequency mixing circuit comprising, a pair of vacuum tubes each having at least an anode, a grid and a cathode, capacitance means cross connecting the anode of each of said tubes to the cathode of the other, a separate input means coupled to the grid of each of said tubes and to which the signals to be mixed are applied, and resistance means connecting both of said tubes across a source of operating potential, said resistance means including a resistance element connected in common to both of said tubes and across which the output from the circuit is taken.

5. A frequency mixing circuit comprising, a pair of vacuum tubes each having at least an anode, a grid and a cathode, capacitance means cross connecting the anode of each of said tubes to the cathode of the other, a separate input means coupled to the grid of each of said tubes and to which the signals to be mixed are applied, a separate resistance element connecting the anode of each of said tubes to a source of operating potential, a separate variable resistance connecting the cathode of each tube to a common junction point, and a parallel combination of resistance and capacitance connecting said junction point to ground and across which the output from the circuit is taken.

6. A frequency mixing circuit comprising a pair of vacuum tubes each having at least anode, grid, and cathode electrodes, coupling means connecting the anode of each tube to the cathode of the other, a separate input connection to one electrode of each of said tubes for receiving the signals to be mixed, and a common output load means coupled to both of said tubes across which the output from the circuit is derived.

RICHARD F. POST.

REFERENCES CITED

The following references are of record in the file of this patent:

UNITED STATES PATENTS

| Number | Name | Date |
|---|---|---|
| 2,519,030 | Dome | Aug. 15, 1950 |

FOREIGN PATENTS

| Number | Country | Date |
|---|---|---|
| 449,470 | Great Britain | June 24, 1936 |